United States Patent
Tippmann, Jr.

[11] Patent Number: 6,003,547
[45] Date of Patent: Dec. 21, 1999

[54] VALVE AND FILLING ARRANGEMENT

[75] Inventor: Dennis J. Tippmann, Jr., Fort Wayne, Ind.

[73] Assignee: Tippmann Pneumatics, Inc., Fort Wayne, Ind.

[21] Appl. No.: 09/128,522

[22] Filed: Aug. 3, 1998

Related U.S. Application Data

[60] Provisional application No. 60/054,617, Aug. 4, 1997.

[51] Int. Cl.⁶ .................................................. F16K 24/00
[52] U.S. Cl. .................................. 137/588; 141/3; 141/5; 141/95; 141/293; 141/382
[58] Field of Search .................. 137/588; 251/149.6, 251/149; 141/95, 2, 3, 4, 5, 18, 21, 383, 386, 382, 302, 309, 291, 292, 293; 222/3

[56] References Cited

U.S. PATENT DOCUMENTS

| | | |
|---|---|---|
| 1,886,175 | 11/1932 | Freygang . |
| 2,645,907 | 7/1953 | Droste et al. . |
| 2,670,605 | 3/1954 | Zandt et al. . |
| 2,880,594 | 4/1959 | Hesson . |
| 2,996,893 | 8/1961 | Goodenough et al. . |
| 3,078,685 | 2/1963 | Flournoy . |
| 3,205,923 | 9/1965 | Wilson ..................................... 141/291 |
| 3,206,938 | 9/1965 | Damsz . |
| 3,212,279 | 10/1965 | Cope . |
| 3,221,782 | 12/1965 | Zellweger et al. ....................... 141/286 |
| 3,306,061 | 2/1967 | Scott et al. . |
| 5,348,059 | 9/1994 | Carroll . |

*Primary Examiner*—Henry J. Recla
*Assistant Examiner*—Peter deVore
*Attorney, Agent, or Firm*—Barnes & Thornburg

[57] ABSTRACT

A method and apparatus for filling a container having an opening with a liquid includes a valve assembly, disposed in the opening of the container, and a nozzle assembly. The valve assembly includes a housing having a plug detachably mounted therein. An inlet passageway extends through the plug to the interior of the container. An inlet valve is located in the inlet passageway. A relief passageway also extends through the plug to the interior of the container, and a relief valve is located in the relief passageway. The nozzle assembly is coupled to a liquid supply and is adapted to matingly engage an inlet port of the valve assembly. The nozzle assembly engages the inlet port to allow liquid from the liquid supply to flow through the inlet passageway into the interior of the container, and opens the relief valve to vent the interior of the container during the filling operation.

28 Claims, 4 Drawing Sheets

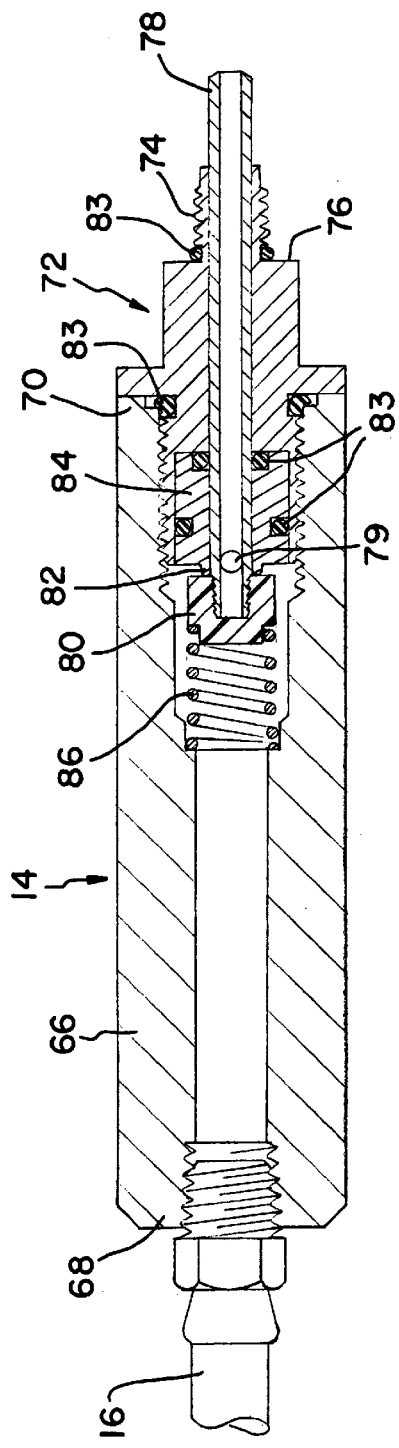
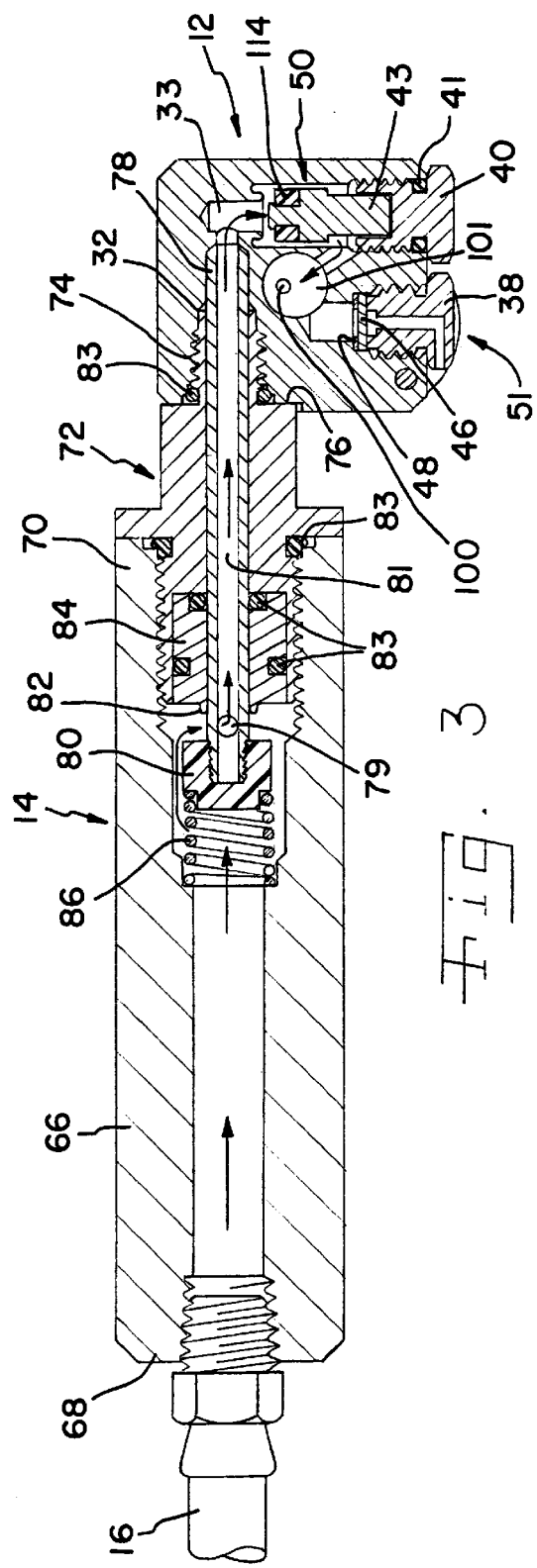

VALVE AND FILLING ARRANGEMENT

RELATED APPLICATION

This application is based upon U.S. Provisional application Ser. No. 60/054,617, filed Aug. 4, 1997, the complete disclosure of which is hereby expressly incorporated herein by this reference thereto.

FIELD OF THE INVENTION

The present invention relates generally to valves and, more particularly, a valve and nozzle arrangement for use in filling tanks with liquids, including liquefied gasses.

BACKGROUND AND SUMMARY OF THE INVENTION

There are numerous instances in which a tank or cylinder or other closed container is to be filled with a liquid, including a liquefied gas. One such instance involves small tanks or cylinders of liquid carbon dioxide ($CO_2$) which are used to supply propellant gas to a paint ball gun. A "typical" tank or cylinder for this particular application holds approximately 9 ounces of liquid $CO_2$.

One procedure now followed in filling a 9 ounce $CO_2$ cylinder involves "syphoning" liquid $CO_2$ from a larger supply tank into the cylinder to be filled. A filling procedure of this type is generally accomplished using the same valved opening into the cylinder which is used to supply gas to the operating elements of the gun. This requires, of course, that the cylinder be removed from the gun for filling.

More specifically, one prior art procedure for filling a small $CO_2$ tank begins with the step of venting or emptying the tank of existing liquid and gas. The tank must typically be emptied unless the exact weight of the tank is known in advance. The tank is then chilled to reduce the volume of the remaining vapor in the tank. This allows liquid to flow into the tank without venting the existing vapor from the tank. Chilling of the tank may be accomplished by emptying a partially-filled tank. As the liquefied gas expands and escapes from the tank, the temperature of the tank drops significantly. Once the tank is emptied and cold, it is weighed. Following this step, the tank is connected to a supply tank to allow liquid $CO_2$ to flow into the tank. The weight of the tank is monitored during filing to determine the amount of $CO_2$ liquid placed in the tank. In some cases (e.g., if the tank is not chilled enough), the initial fill operation does not result in the required amount of liquid in the tank (for example, 9 ounces in tanks typically used with some paint ball guns). In that case, the tank is vented to further reduce the temperature, and the fill procedure is repeated.

Under "field" conditions a typical 9 ounce tank may take 2–3 minutes. A "full" tank is about ¾ filled by volume to allow for some expansion of the gas to occur as the tank warms. Overfilling a tank can result in hazardous pressure buildups. To guard against over pressurization, rupture disks are typically used with prior art tanks.

One embodiment of the present invention includes a valve assembly which fits into the threaded opening of a cylinder, such as a standard 9 ounce $CO_2$ cylinder. The valve assembly is used in conjunction with a nozzle assembly which is attached to a hose which, in turn, is connected to a source of supply of liquid $CO_2$. The valve assembly and nozzle of the present invention allow for filling a warm cylinder with liquid $CO_2$, filling a 9 ounce $CO_2$ cylinder in a matter of seconds, rather than minutes, providing a visual indication that a tank has been properly filled to the appropriate level without requiring that the tank be weighed before or after the fill operation, and filling the cylinder through a separate fill inlet in the valve assembly which allows the cylinder to be filled while remaining mounted to the gun (or other appliance).

This embodiment of the valve and nozzle assembly of the present invention provides a separate, valved inlet which communicates with the interior of the tank or cylinder for receiving liquid into the tank. A vent opening, also communicating with the inside of the tank, allows vapor inside the tank to exit as liquid enters through the inlet. A shoulder or surface on the fill nozzle opens a vent on the valve assembly when the nozzle engages the valve assembly during the filling operation. A double-valve connection is provided between the supply tank and the tank or cylinder to be filled (i.e., one valve in the nozzle and one valve in the valve assembly).

Other advantages and novel features of the present invention will become apparent from the following detailed description of the invention when considered in conjunction with the accompanying drawings.

BRIEF DESCRIPTION OF THE DRAWINGS

One embodiment of the present invention is shown in detail in connection with the following drawings, in which:

FIG. 2 is a cross section taken along lines 2—2 of FIG. 1 showing internal components of the nozzle of the present invention.

FIG. 3 is a cross section taken along line 3—3 of FIG. 1, with the cross section of FIG. 2 shown in the filling position.

DETAILED DESCRIPTION OF THE DRAWINGS

Figure 1:
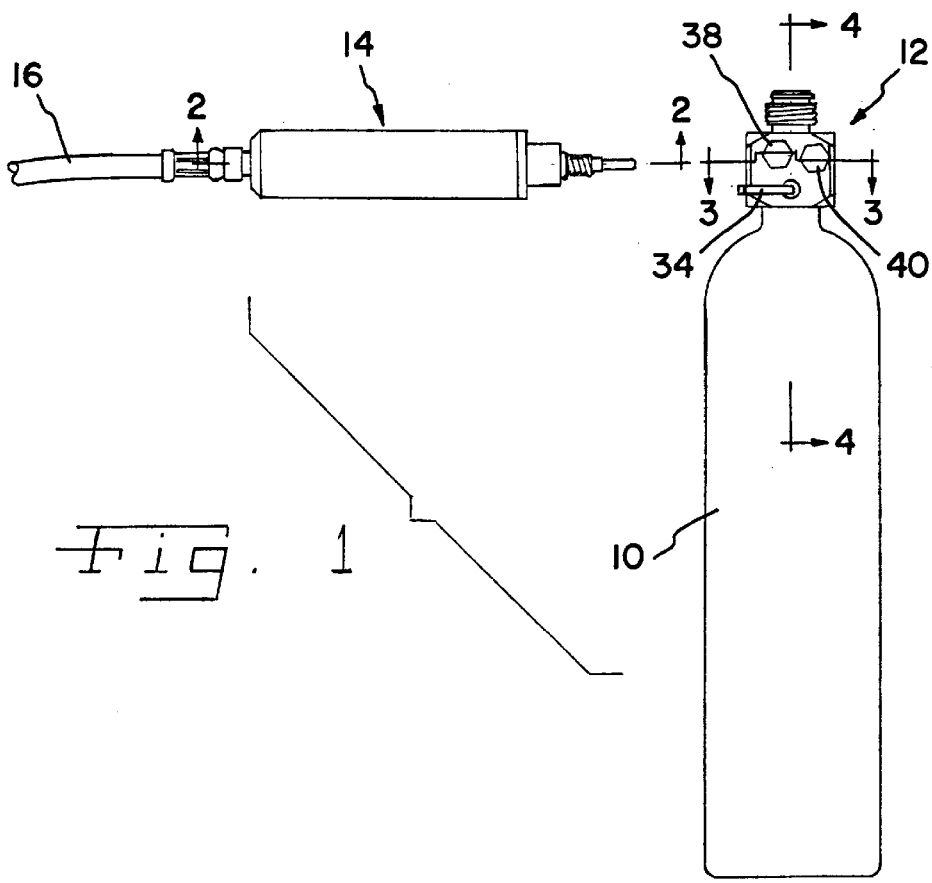
FIG. 1 is a front view of a tank with an embodiment of the valve assembly of the present invention installed in the top of the tank, and an embodiment of the nozzle of the present invention attached to a supply hose.

FIG. 1 shows a closed container in the form of a tank or cylinder 10 (which may be a 9 ounce $CO_2$ cylinder) with a valve assembly 12 installed in a top, threaded opening. Also shown in FIG. 1 is a supply nozzle 14 constructed in accordance with the present invention. Nozzle 14 is connected to a supply hose 16 which, in turn, is connected to a supply of liquid $CO_2$ (not shown).

FIG. 2 shows a cross section of nozzle 14. Nozzle 14 includes a main body 66 which receives supply hose 16 through a threaded connection on a first end 68 thereof. A second end 70 of main body 66 is closed by plug assembly 72. Threads 74 are provided on plug assembly 72 to secure nozzle 14 to an inlet port 32 of valve assembly 12 during the filling operation. A surface or shoulder 76 on plug assembly 72 contacts the end of a vent arm 34 of valve assembly 12, causing a relief vent 56 to open during the filling operation, as is explained in additional detail below.

Plug assembly 72 further includes a plunger assembly 78 which carries an elastomeric seal element 80, one face of which is spring biased toward a protruding ridge 82 around an opening in element 84. Spring 86 urges seal element 80 against ridge 82 when the nozzle is not in use, as illustrated in FIG. 2. When nozzle assembly 14 is inserted into inlet port 32 of valve assembly 12, the plunger portion of plunger assembly 78 is mechanically displaced against the biasing force of spring 86 (as illustrated in FIG. 3) to open the seal formed between elements 80 and 82. This allows liquid (for instance liquid $CO_2$) to flow through main nozzle body 66, opening 79, and through channel 81 formed in the plunger portion of plunger assembly 78 and into valve assembly 12 during the filling operation. These components thus operate as a valve to regulate the flow of liquid from the supply. This flow path is illustrated by the arrows in FIG. 3. O-ring seals 83 are provided as necessary to seal potential leakage flow paths between elements of nozzle assembly 14, as necessary.

Figure 4:
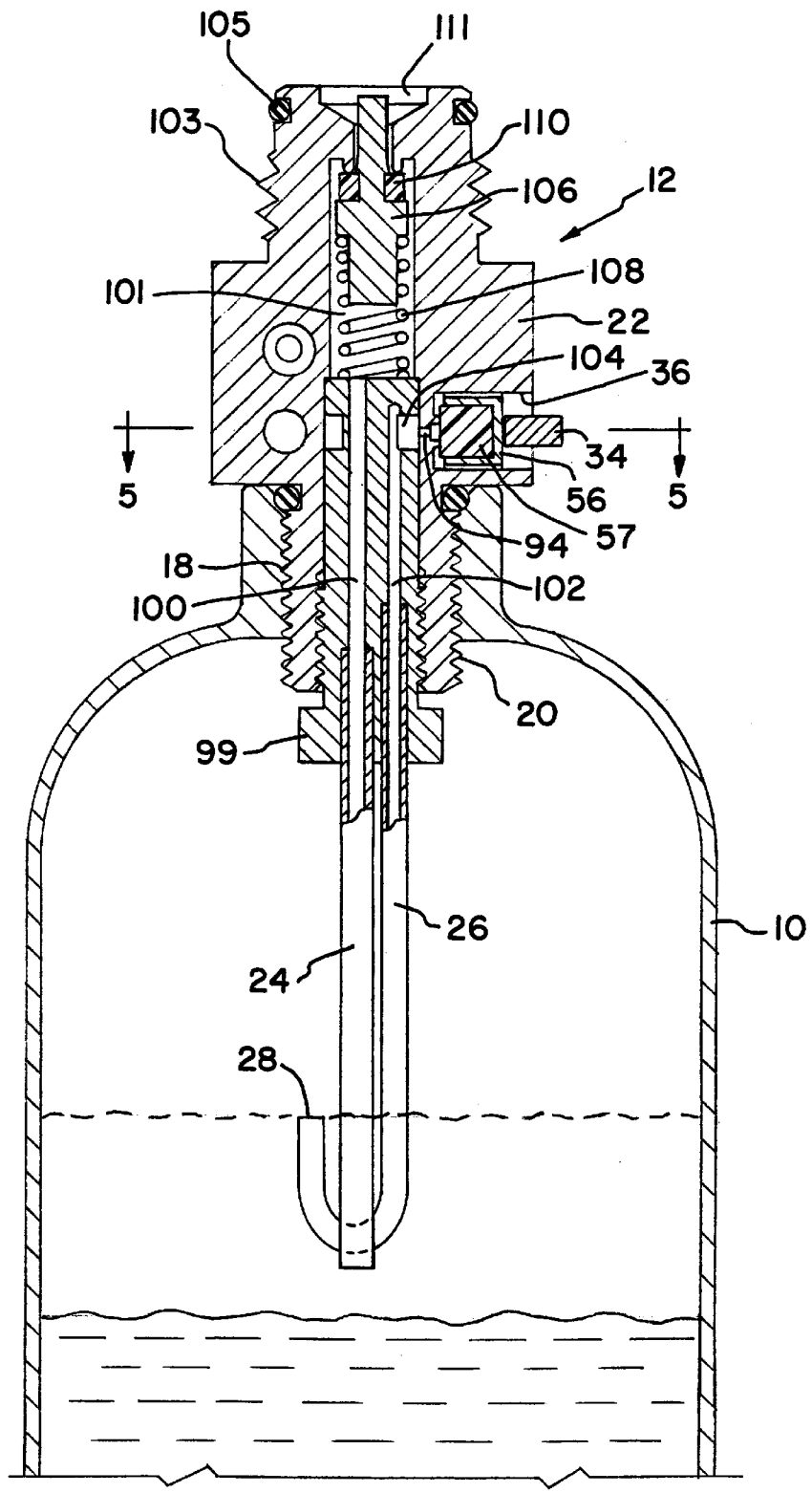
FIG. 4 is a cross section taken along lines 4—4 of FIG. 1 showing internal components of the valve assembly of the present invention and a portion of the tank.

FIG. 4 shows a cross section taken along line 4—4 of FIG. 1 through valve assembly 12. Tank 10 is provided with a threaded opening 18. Threads 20 on the main valve body 22 of valve assembly 12 engage the threads of opening 18 to secure valve assembly 12 to tank 10. Extending downwardly into the interior of tank 10 from valve assembly 12 are two tubes—inlet tube 24 and vent tube 26. In operation, liquid (such as liquid $CO_2$) enters tank 10 through inlet tube 24 in a manner which will be described in more detail below. At the same time, vapor from the interior of the tank is vented through vent tube 26. As shown, vent tube 26 is "j-shaped" with the level of inlet 28 approximating the "full" level of liquid in tank 10 when the tank is in an upright orientation.

The top ends of tubes 24 and 26 are secured in bores 100 and 102, respectively, of main plunger plug 99. Bore 102 extends from the bottom, as shown in FIG. 4 of plug 99, up through plug 99 to the level of a circumferential slot 104. Bore 102 opens into circumferential slot 104 which, in turn, is in fluid communication with a relief port 94 formed in main valve body 22. Bore 100, on the other hand, does not communicate with circumferential slot 104, but rather extends through the entire length of plug 99. Appropriate sealing elements may be used to maintain the separation of these two flow paths.

Disposed above main plunger plug 99, in a space identified by numeral 101, is main plunger 106, spring 108 and elastomeric sealing element 110. Threads 103 are provided on main body 22 to allow for attachment to a gas powered appliance (such as a paint ball gun). Seal elements, such as o-ring 105, are provided as appropriate to insure a tight connection. When valve body 22 is secured by threads 103 to the appliance, plunger 106 is depressed to provide a flow path through bore 100 of tube 24, through space 101, by elastomeric sealing element 110 (when plunger 106 is depressed), through outlet port 111 and to the connected appliance.

Referring again to FIG. 3, inlet port 32 opens into an inlet passageway 33 which, in turn, communicates with space 101 and the interior of tank 10 via bore 100 and tube 24. Disposed in passageway 33 is an inlet valve assembly 50. Valve assembly 50 includes threaded plug 40, o-ring seal 41, plunger 43, and elastomeric seal element 114. Check valve assembly 50 is opened by the presence of flow in passageway 33 in the direction of the arrows shown in FIG. 3. When nozzle 14 is removed (i.e., at all times other than during the filling operation), pressure inside tank 10 causes check valve assembly 50 to close. Although a spring biasing means could be used with check valve assembly 50, the present embodiment does not provide for or rely on such a spring element.

Shown adjacent inlet check valve assembly 50 in FIG. 3 is a rupture disk assembly 51 which includes vented plug 38, a rupture disk 46 and a sealing washer 48. The rupture disk assembly communicates with the interior of tank 10 via space 101 and bore 100. If the pressure within tank 10 exceeds a predetermined level, rupture disk 46 will open to vent excess pressure through vented plug 38. Once ruptured, disk 46 must be replaced before the tank can be returned to service.

Figure 5:
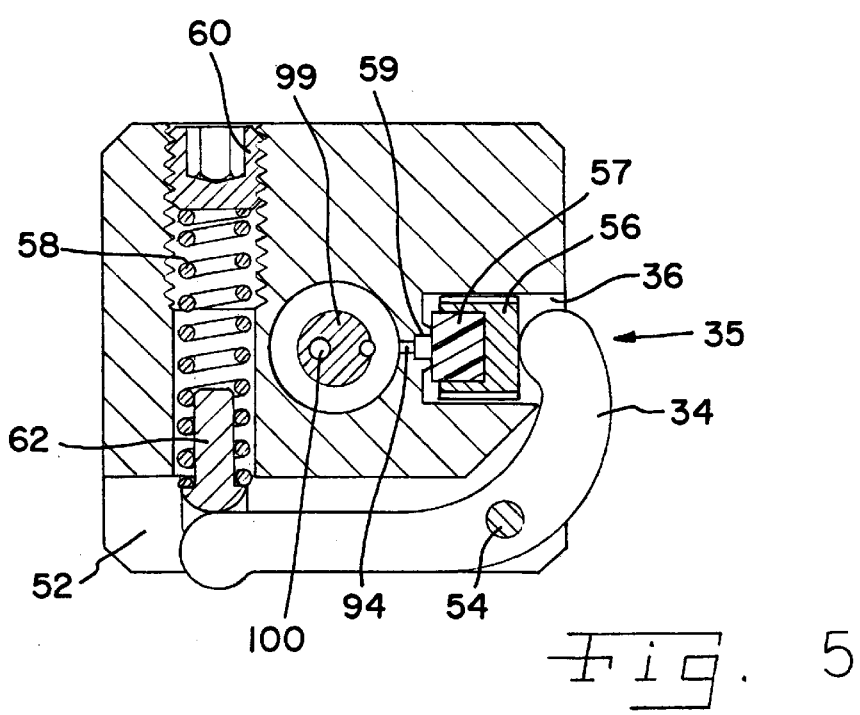
FIG. 5 is a cross section taken through line 5—5 of FIG. 4.
Figure 6:
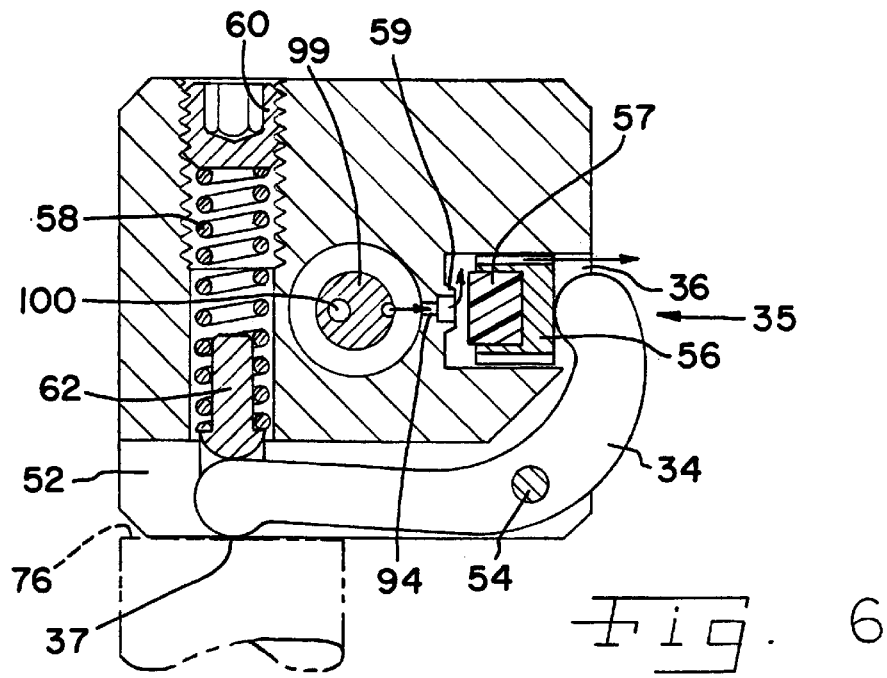
FIG. 6 is a cross section taken through line 5—5 of FIG. 4, with a portion of the nozzle (in dashed lines) shown in the filling position.

Valve assembly 12 is also fitted with a relief valve assembly 35 which is shown in detail in the cross sections taken along line 5—5 of FIG. 4. With reference to FIGS. 5 and 6, this relief valve assembly includes lever vent arm 34 and relief plunger 56. Vent arm 34 is pivotally mounted in a slot 52 which is milled into main body 22 of valve assembly 12. Vent arm 34 is pivotally mounted to body 22 by pin 54. Plunger 56 is received within a bore 36. An elastomeric portion 57 of plunger 56 forms a seal around a raised lip 59 which surrounds relief port 94. Vent arm 34 applies a closing force to plunger 56. This closing force is adjustable by means of tension adjusting spring 58, associated set screw 60 and element 62 all of which are used to apply an adjustable force which serves to keep relief vent plunger 56 closed during "normal" operations, but which allows it to open during filling operations to vent the tank. The closing force applied by vent arm 34 may also be adjusted to allow relief plunger 56 to open to vent the tank in the event pressure builds in the interior of the tank to an undesired level. Such venting preferably occurs before the internal pressure of the container would reach the predetermined level required to rupture disk 46. The relief valve assembly and the rupture disk assembly thus provide two levels of protection against a failure of the tank due to excessive internal pressure.

The manner in which relief valve assembly 35 is opened during filling operations to vent the tank is illustrated in FIG. 6. Briefly, a portion of nozzle assembly 14 contacts vent lever arm 34 causing it to pivot as illustrated in FIG. 6, allowing relief plunger 56 and associated elastomeric element 57 to open relief port 94. Specifically, in the embodiment illustrated in the drawings, shoulder 76 contacts vent lever arm 34 at the location generally indicated by reference numeral 37 to displace arm 34 against the biasing force of spring 58. As previously discussed, the amount of force exerted by spring 58 on lever vent arm 34 may be adjusted by set screw 60.

Figure 7:
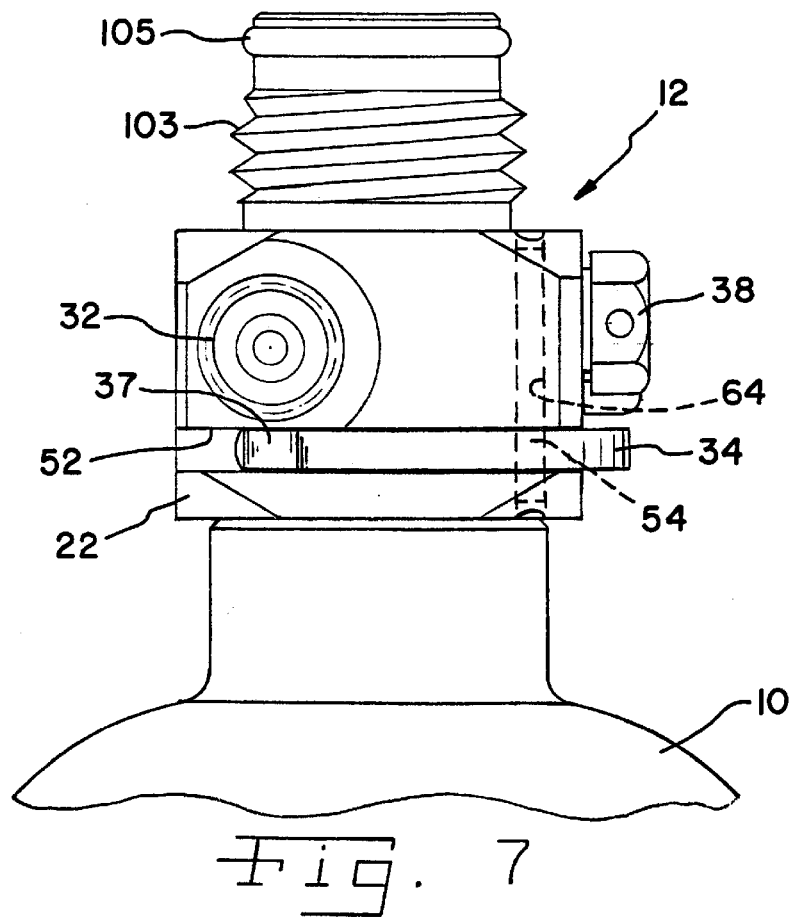
FIG. 7 is an enlarged view of the valve assembly of the present invention as mounted in the opening of the tank.

FIG. 7 shows an enlarged portion of the tank and valve assembly of FIG. 1, as viewed from the inlet side (i.e., the side of valve assembly 12 which is engaged by supply nozzle 14). Visible in FIG. 7 is threaded inlet 32 and slot 52 which is milled into main valve body 22 to accommodate vent lever arm 34. Pivot pin 54 is shown in dashed lines in FIG. 7.

In the embodiment illustrated, both the valve arrangement in nozzle assembly 14 and relief valve assembly 37 are opened by the act of engaging nozzle assembly 14 within threaded inlet port 32. Although this arrangement is preferred, other arrangements may also be used. For example, an alternative to threads (such as a bayonet fitting) could be used to engage and secure nozzle assembly 14 in inlet port 32. Furthermore, other portions of nozzle 14 (i.e., other than shoulder 76) could be used in contacting and displacing lever vent arm 34 to open relief valve assembly 35.

In operation, nozzle 14 is inserted into inlet opening 34 and secured to that opening by the threads shown. Shoulder 76 depresses an end of lever vent arm 34, causing relief valve assembly 37 to open. Plunger 78 of nozzle assembly 14 is mechanically depressed by contact with valve body 22, allowing for flow of liquid $CO_2$ through nozzle assembly 14, valve body 22, plug 99 and tube 24 into tank 10. Liquid $CO_2$ typically flows under the force of gravity and/or the pressure of gaseous $CO_2$ in the space above the level of liquid $CO_2$ in the supply tank. When the liquid in tank 10 reaches the level of inlet opening 28 of vent tube 26, liquid $CO_2$ in the form of "snow" will be seen exiting from port 36. This provides a visual indication that the proper level of liquid $CO_2$ has been reached. Nozzle assembly 14 is then removed, allowing lever arm 34 to close relief valve assembly 37.

In some embodiments, relief valve assembly 37 may perform a safety pressure relief function when the tank is not being filled. Although this additional function may, in certain instances, prove advantageous, it is not required that every embodiment of the present invention include this feature. In one embodiment, the relief vent is adjusted to open at approximately 1,800 pounds per square inch (p.s.i.) tank pressure, and close again at approximately 1,200 p.s.i. pressure. In contrast, the rupture disk typically used with tanks of the type described will rupture at approximately 3,000 p.s.i. pressure. Once ruptured, the disk must be replaced before the tank can be returned to service. The relief vent, on the other hand, will open at approximately 1,800 p.s.i., reduce pressure in the tank to approximately 1,200 p.s.i., at which time the relief valve will close. Use of the cylinder can then continue without delay.

As previously noted, the arrangement of the present invention allows for a tank to be filled without pre-chilling the tank. Moreover, the tank can be filled while installed on a paint ball gun (or other gas-powered apparatus). The tank can also be "topped off" without first emptying the entire tank or ascertaining the exact weight of the tank to avoid overfilling. There may also be advantages attendant to being able, through the use of the present invention, to permanently couple the tank to a paint ball gun or other apparatus, or otherwise integrate the tank into the overall structure of the apparatus.

The particular embodiment described and illustrated in the description and drawings is considered to be an illustrative example only. The present invention is not limited to this particular embodiment. Although the present invention has been described with reference to a particular embodiment, one skilled in the art can ascertain the essential characteristics of the present invention from the foregoing description. Various changes and modifications may be made to adapt the various uses and characteristics without departing from the spirit and scope of the present invention. The spirit and scope of the invention are to be limited only by the terms of the appended claims.

What is claimed:

1. Apparatus for filling a container having at least one opening with a liquid, comprising:
   a valve assembly defining a housing and disposed in the opening of the container, said valve assembly having:
   a main plunger plug detachably mounted within said housing;
   an inlet port, an inlet passageway extending through said main plunger plug between the inlet port and an interior of the container, and an inlet valve located in the inlet passageway; and
   a relief port, a relief passageway extending through said main plunger plug between the relief port and the interior of the container, and a relief valve located in the relief passageway; and
   a nozzle assembly, coupled to a liquid supply, said nozzle assembly having an outlet end adapted to matingly engage the inlet port of the valve assembly.

2. Apparatus according to claim 1, wherein said valve assembly further comprises an outlet port, an outlet passageway, and an outlet valve located in the outlet passageway.

3. Apparatus according to claim 1, wherein said relief passageway comprises a j-shaped tube extending into the interior of the container.

4. Apparatus according to claim 3, wherein an inlet of the j-shaped tube is disposed at a level of maximum fluid capacity of the container when the container is in an upright orientation.

5. Apparatus according to claim 3, wherein an end of the j-shaped tube is disposed in a bore in the main plunger plug of the valve assembly.

6. Apparatus according to claim 5, wherein said bore on the main plunger plug comprises a portion of the relief passageway, and wherein said bore communicates with a circumferential slot formed in the main plunger plug.

7. Apparatus according to claim 6, wherein said relief port is in fluid communication with said circumferential slot.

8. Apparatus according to claim 1, wherein said relief valve opens said relief port when liquid is flowing into the container through the inlet port and inlet passageway.

9. Apparatus according to claim 1, wherein said relief valve comprises a relief plunger and a lever vent arm.

10. Apparatus according to claim 9, wherein said relief plunger comprises an elastomeric element for sealing a surface surrounding the relief port.

11. Apparatus according to claim 9, wherein said lever vent arm is pivotally mounted to the valve assembly, and spring-biased against the relief plunger to urge the plunger toward a closed position.

12. Apparatus according to claim 9, wherein a portion of said nozzle assembly interacts with said lever vent arm when the nozzle assembly is matingly engaged with the inlet port so as to allow the relief plunger to open the relief port.

13. Apparatus according to claim 9, wherein the lever vent arm applies a force to the relief plunger tending to close the relief port, and wherein the closing force applied to the relief plunger by the vent arm is adjustable.

14. Apparatus according to claim 1, wherein said nozzle assembly comprises a main body having a flow passageway therein, a plug assembly for closing one end of the flow passageway, and a plunger assembly for selectively allowing flow through the plug assembly.

15. Apparatus according to claim 14, wherein an upstream end of the flow passageway in the main body is coupled to the liquid supply.

16. Apparatus according to claim 14, wherein said plunger assembly cooperates with the valve assembly to open the flow passageway through the plug assembly when the nozzle assembly matingly engages the inlet port of the valve assembly.

17. Apparatus according to claim 14, wherein said plunger assembly comprises a hollow plunger, an elastomeric element mounted on an upstream end of the plunger, and a spring for urging the elastomeric element toward a position which blocks flow through the hollow plunger.

18. Apparatus according to claim 13, further comprising a rupture disk assembly designed to vent the interior of the container if the interior pressure exceeds a predetermined level.

19. Apparatus according to claim 18, wherein the closing force is adjustable to a level which allows the relief plunger to be opened against the closing force by an interior pressure which is less than the predetermined level required to rupture the rupture disk.

20. Apparatus according to claim 1, wherein said inlet valve is constructed as a one-way flow valve.

21. A method of filling a container having at least one opening with a liquid, comprising the steps of:

providing a valve assembly defining a housing in the opening of the container, said valve assembly having a main plunger plug detachably mounted within said housing, an inlet port, an inlet passageway extending through said main plunger plug between the inlet port and an interior of the container, and an inlet valve located in the inlet passageway; and a relief port, a relief passageway extending through said main plunger plug between the relief port and the interior of the container, and a relief valve located in the relief passageway;

providing a nozzle assembly coupled to a liquid supply;

engaging an outlet end of the nozzle assembly with the inlet port of the valve assembly;

opening a supply valve to allow liquid from the liquid supply to flow through the nozzle assembly and the inlet passageway into the interior of the container; and opening the relief valve to vent the interior of the container.

22. A method according to claim 21, wherein the supply valve is located within the nozzle assembly.

23. A method according to claim 22, wherein the step of opening the supply valve includes the step of mechanically displacing a portion of the supply valve as an outlet end of the nozzle assembly engages the inlet port.

24. A method according to claim 23, wherein the portion of the supply valve displaced is a plunger having a channel formed therein to accommodate the flow of liquid.

25. A method according to claim 21, wherein the step of opening the relief valve includes the step of engaging a portion of the relief valve with a portion of the nozzle assembly as the nozzle assembly engages the inlet port to open the relief valve.

26. A method according to claim 21, including the additional step of providing a visible indication that the container is full of liquid.

27. A method according to claim 26, wherein said visible indication is the presence of liquid exiting the tank at the relief port.

28. A method according to claim 26, including the additional step of disengaging the nozzle assembly from the inlet port to close the supply valve and the relief valve when the container is full.

* * * * *